United States Patent
Delavaux

(10) Patent No.: US 6,212,209 B1
(45) Date of Patent: Apr. 3, 2001

(54) SWITCHABLE LASER USING A FARADAY ROTATOR

(75) Inventor: Jean-Marc Pierre Delavaux, Wescosville, PA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/042,526

(22) Filed: Mar. 16, 1998

(51) Int. Cl.[7] .......................................................... H01S 3/11
(52) U.S. Cl. ................................. 372/10; 372/18; 372/37; 372/98
(58) Field of Search .................................. 372/10, 20, 21, 372/25, 29, 30, 37, 92, 98

(56) References Cited

U.S. PATENT DOCUMENTS

| 4,637,027 | * | 1/1987 | Shirasaki | 372/27 |
| 4,975,918 | * | 12/1990 | Morton | 372/20 |
| 5,701,319 | * | 12/1997 | Fermann | 372/18 |
| 5,732,095 | * | 3/1998 | Zorabedian | 372/22 |
| 5,923,686 | * | 7/1999 | Fermann | 372/18 |

\* cited by examiner

Primary Examiner—Teresa M. Arroyo
Assistant Examiner—Gioacchino Inzirillo
(74) Attorney, Agent, or Firm—Wendy W. Koba

(57) ABSTRACT

In a laser such as a mode-locked or Q-switched laser, one of the resonator reflectors comprises a switchable Faraday rotator mirror coupled to a switchable magnetic field source. The operation of the laser is therefore controlled by the application of the magnetic field to the Faraday rotator device. When no magnetic field is applied, the device behaves as an isolator and thereby breaks the signal path between the resonator reflectors. When a saturation magnetic field is applied, the reflectors, disposed on opposite sides of the optical gain medium, thereby form a cavity such that lasing will occur. The device may be formed of discrete components or fabricated as an integrated optical device.

6 Claims, 2 Drawing Sheets

SWITCHABLE LASER USING A FARADAY ROTATOR

FIELD OF THE INVENTION

The present invention relates generally to switchable lasers and, more particularly, to Q-switched lasers and mode-locked lasers.

BACKGROUND OF THE INVENTION

Pulsed lasers are used in a wide variety of applications ranging from signal sources in telecommunications systems to optical sources in sensing and measuring equipment. Q-switched lasers, for example, provide high power, short duration pulses for optical sensing functions, optical time domain reflectometry, and the measurement of nonlinearities in optical fibers. Illustratively, Q-switched lasers are capable of generating peak pulse powers of the order of a few hundred watts or more at repetition rates in the tens of kilohertz range. Pulse durations of about 1–100 nanoseconds are typical. Mode-locked lasers, on the other hand, may serve as high speed (e.g., multi-gigabit) signal sources in telecommunications systems, particularly soliton transmission systems. As such, the mode-locked laser may generate peak pulse powers of a few hundred milliwatts at repetition rates in excess of 10 Ghz. Pulse durations of a few picoseconds are typical.

Q-switched and mode-locked lasers have been extensively reported in the scientific literature. Two basic structures have been successfully demonstrated: a fiber laser ring topology of the type described by F. Fontana et al. in U.S. Pat. No. 5,381,426 issued on Jan. 10, 1995 and a Fabry-Perot (FP) fiber laser configuration of the type shown in U.S. Pat. No. 5,450,427 granted to M. E. Fermann et al. on Sep. 12, 1995. Most conventional laser designs rely on the use of an electro-optic, acoustic-optic or absorption modulators. These modulators are all bulk optic components, rendering the overall laser design less integrable, or limited to certain configurations or materials.

Thus, a need remains in the art for a relatively simple switched laser design.

SUMMARY OF THE INVENTION

The need remaining in the prior art is addressed by the present invention, which relates to a switched laser configuration and, more particularly, to a switched laser that uses a switchable Faraday rotator to control the switching activity in the laser.

In a preferred embodiment the switchable laser comprises a switchable Faraday mirror coupled to a gain medium, with a second reflective surface disposed beyond the output of the medium. The laser's cavity length is defined by the combination of the switchable Faraday mirror, gain medium and second reflective surface. The switching function within the Faraday mirror is controlled by an applied magnetic field. When no magnetic field is applied, the Faraday rotator isolates the first reflective surface from the second reflective surface and no lasing occurs. When a magnetic field is then applied, the Faraday rotator becomes transmissive and a lasing cavity is formed by the pair of reflectors on either side of the gain medium, providing lasing and gain at the frequency determined by the total cavity length. Therefore, the switching activity of the laser is controlled by switching the magnetic field applied to the laser. A current or voltage applied to a magnetic source is used to provide the switchable magnetic filed in the first instance.

In general, a Faraday rotator yields a 90° polarization rotation to the signal passing therethrough. Thus, in order to provide an appropriate aligned amplified output signal, the signal must make two passes through the laser cavity so that it is fully rotated 180°. In an alternative embodiment of the present invention, the Faraday rotator device may be formed to comprise twice its conventional length so that the signal will rotate through the full 180° before entering the laser gain medium. Additionally, the second mirror forming the laser may be a bandwidth-limited mirror including a grating (such as a UV fabricated grating) structure to produce the necessary wavelength selectivity.

Other and various features of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
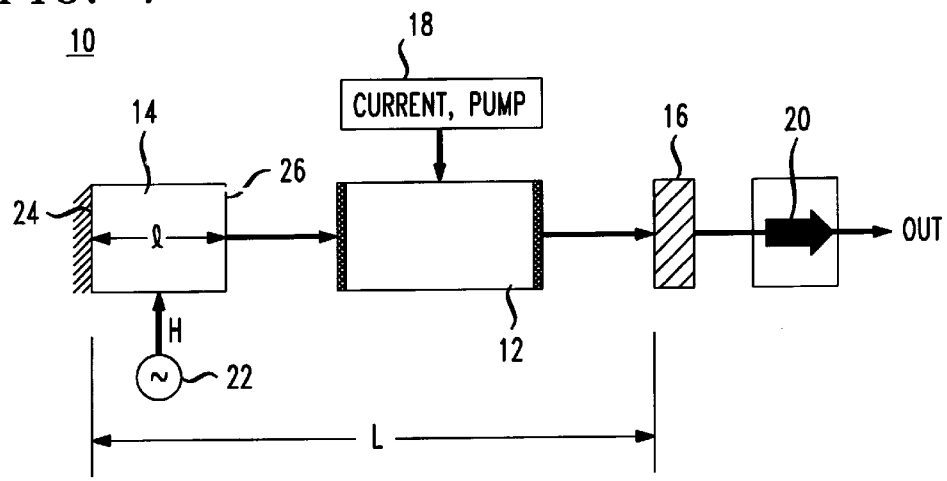
FIG. 1 illustrates an exemplary switchable laser using a Faraday rotator in accordance with the present invention.

The principles of the present invention may be readily understood by reviewing the arrangement of switchable laser 10 of FIG. 1. Laser 10 comprises a gain medium 12 disposed on an optical axis between a switchable Faraday rotator mirror 14 and a second mirror or reflector 16. Laser 10 may operate, for example, as either a Q-switched or mode-locked laser. A source 18 of pump energy is coupled to gain medium 12 and supplies electromagnetic energy at a wavelength and intensity sufficient for gain medium 12 to provide optical gain. The interconnections between components, depicted as black solid lines, are optical waveguides; for example, optical fibers or substrate-supported integrated waveguides. Indeed, as will be discussed below, the gain medium itself may be a suitable semiconductor-doped optical fiber or solid state planar waveguide. As depicted, the output of the laser is taken through reflector 16, which, therefore, is made to be partially transmissive. The output signal is coupled to a utilization device (not shown) through an isolator 20. The latter serves to prevent unwanted reflections from being coupled back into the laser and causing instability in the laser performance. As is well known in the art and discussed below, the output signal can be taken from other locations within the laser structure.

Figure 2:
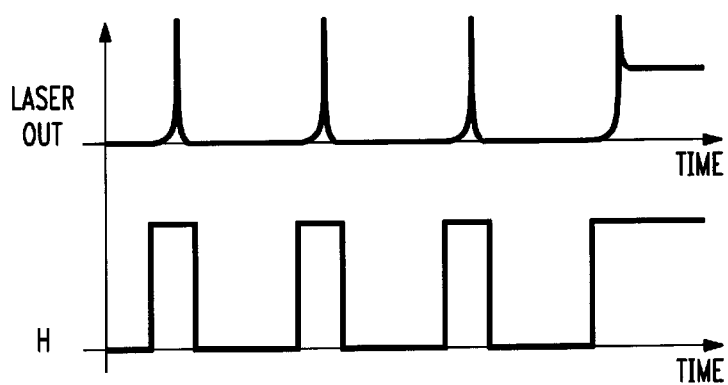
FIG. 2. contains a graph illustrating the application of a series of magnetic field pulses to a switchable Faraday rotator and the associated laser output pulses.

In accordance with the teachings of the present invention, Faraday rotator 14 is controlled by a magnetic field source 22. When source 22 applies no saturating magnetic field H to Faraday rotator 14, Faraday rotator 14 functions as an isolator between reflective surface 24 and reflector/polarizer 16. In particular, Faraday rotator 14 leads to the introduction of high optical loss into the cavity (greater than 20 dB). Therefore, no lasing occurs. With the application of a saturation magnetic field H to Faraday rotator 14, the device becomes transmissive and reflective surface 24 of Faraday rotator defines a reflection endpoint for the laser cavity. Therefore, a laser of cavity length L defined by Faraday rotator 14, gain medium 12 and reflector 16 is formed, wherein the lasing waveguide is determined by cavity length L. FIG. 2 is a simplified graph depicting the relationship between the applied saturation magnetic field H and the output laser pulses. In accordance with the present invention, therefore, pulse switching can easily be controlled by the action of magnetic field source 22 and the frequency of the saturation magnetic field pulses applied to switchable Faraday rotator 14. Continuous lasing may be provided simply by maintaining the application of the saturation magnetic field, as shown in FIG. 2.

In general, switchable Faraday rotator yields a polarization that is rotated 90° with respect to the polarization of the input signal (that is, the polarization of the signal will be rotated by an angle of 45° on each pass through the device). Therefore, the signal must traverse the entire laser cavity twice to achieve the full 180° required to exit through reflector 16. Alternatively, switchable Faraday rotator 14 may be formed of a length l twice the nominal length of a conventional switchable Faraday rotator. In this case, the optical signal will experience the full 180° rotation on a single pass through the laser cavity.

Figure 3:
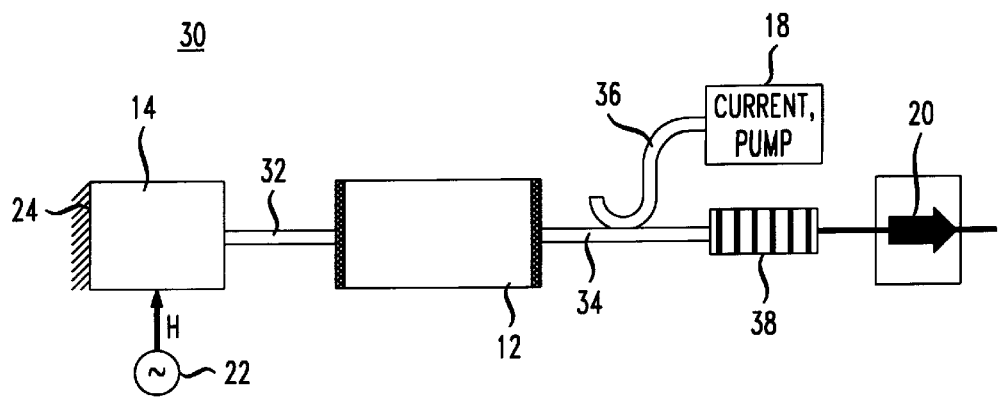
FIG. 3 illustrates an exemplary switchable laser configuration of the present invention, incorporating a grating structure within the laser cavity.

In accordance with the present invention, the bandwidth of reflector 16 can be limited to a specific wavelength range around a particular wavelength $\lambda$ by incorporating a grating into the laser structure. FIG. 3 illustrates one such arrangement. In particular, switchable laser 30 comprises, like arrangement 10 of FIG. 1, a gain medium 12 and a switchable Faraday mirror 14 controlled by a magnetic field source 22. For the particular embodiment of FIG. 3, an optical fiber 32 is disposed between Faraday mirror 14 and gain medium 12. Gain medium 12 is an active gain medium and may comprise either a doped-fiber amplifier or an integrated waveguide amplifier structure. A second optical fiber 34 is coupled to the output of gain medium 12. Pump signal P from pump source 18 is coupled into gain medium 12 using a multiplexer including an optical fiber 36 that is coupled, as shown, to second fiber 34. As is well-known in the art, the propagation direction of the pump signal is irrelevant to achieving gain within the doped media. Alternatively, therefore, pump signal P could be multiplexed through first optical fiber 32 into gain medium 12. A reflective grating 38, such as a partially reflective linear grating or chirped grating, is coupled to second fiber 34. Grating 38 may be formed using well-known UV fabricating techniques and may comprise either an optical fiber or optical substrate device. As with the arrangement of FIG. 1, isolator 20 is disposed at the output of laser 30 to prevent reflections from being re-introduced into the laser cavity.

Figure 4:
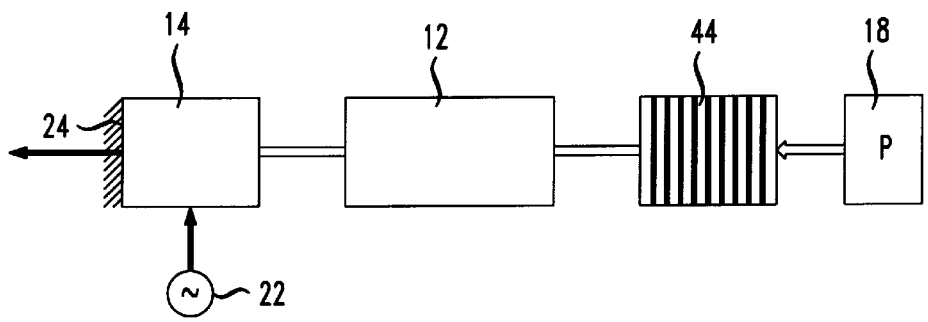
FIG. 4 is an alternative embodiment of a switchable laser including an in-line reflection grating.

An alternative switched laser arrangement 40 is illustrated in FIG. 4. In this case, the propagation direction of the system has been reversed. Accordingly, fully reflective surface 24 of Faraday mirror 14 (as shown in the embodiments of FIGS. 1 and 3) has been replaced by a partially reflecting surface 42, where reflecting surface 42 is chosen to be able to pass the output wavelength of the laser structure. The pump signal P from source 18 passes through reflective grating 44 (chosen to be fully reflective at the lasing wavelength) and thereafter enters gain medium 12. Switchable Faraday mirror 14 is controlled in the manner described above to provide the second reflective surface for the optical cavity when a saturating magnetic field is present. The in-line arrangement as shown is expected to experience less loss than the arrangement of FIG. 3, which requires a multiplexer to introduce the pump signal into the system.

Figure 5:
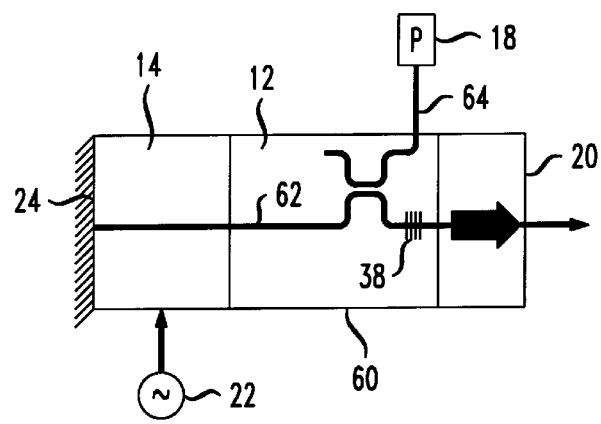
FIG. 5 is a monolithic realization of the laser arrangement of FIG. 3.

The switched laser embodiments of FIGS. 3 and 4 are illustrated as comprising discrete components. However, switchable lasers of the present invention may also be formed as integrated device structures. FIG. 5 illustrates an arrangement of switched laser 30 as shown in FIG. 3, using a set of three optical substrates to form the laser. Switchable Faraday rotator 14 is formed on a first optical substrate, with source 22 applying the saturating magnetic field. A second optical substrate 60, for example, lithium niobate, is formed to comprise a rare earth-doped waveguide section 62 that is used as the gain medium for the laser. The formation of such integrated optical waveguides is well-known in the art. A second waveguide 64 is used to couple the pump signal P into the doped waveguide structure. A filter grating 38 is etched into the surface of substrate 60 using well-known UV lithography techniques. The output isolator is formed on a third substrate and coupled to receive the optical signal passing through grating 38. Isolators and Faraday rotators would be integrated as reported in the prior art. In accordance with the present invention, the arrangement could be provided without the use of an external magnet (by using a thin film Faraday material) resulting in a more compact integrated arrangement.

Figure 6:
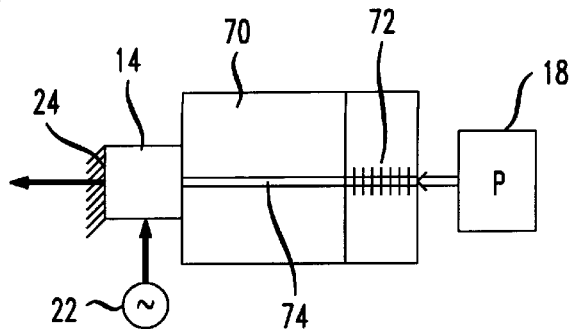
FIG. 6 is a monolithic realization of the laser arrangement of FIG. 4.

An integrated embodiment of laser 40 of FIG. 4 is shown in FIG. 6. In this arrangement, the fiber grating 72 is formed on the same substrate 70 as the doped amplifying waveguide 74. In particular, grating 72 may be localized, as shown, or distributed over the amplifying waveguide section, thus reducing the overall cavity length of the laser. The reduction in cavity length would lead to higher laser performance; that is, shorter pulses and higher output power.

It is to be understood that the above-described embodiments are merely illustrative of the many possible specific embodiments that can be devised to represent application of the principles of the invention. Numerous and varied other arrangements can be devised in accordance with these principles by those skilled in the art without departing from the spirit and scope of the invention.

What is claimed is:

1. A switchable laser comprising
    a first optical channel including
        first and second reflectors forming a resonator,
        gain medium disposed in said resonator,
        a source of pump energy coupled to said gain medium to cause said medium to generate lasing radiation,
    said first reflector comprising a switchable Faraday rotator coupled to a switchable magnetic field source and a reflective surface, said switchable Faraday rotator providing isolation between said reflective surface and said second reflector in the absence of an applied magnetic field to prevent lasing and providing coupling between said reflective surface and said second reflector in the presence of an applied magnetic field so as to allow for said gain medium to generate lasing radiation.

2. A switchable laser as defined in claim 1 wherein the laser further comprises an isolator disposed beyond the second reflector at the output of the laser.

3. A switchable laser as defined in claim 2 wherein the laser further comprises a bandpass filter disposed between the second reflector and the optical isolator.

4. A switchable laser as defined in claim 1 wherein the pump is coupled into a waveguide beyond the gain medium.

5. A switchable laser as defined in claim 1 wherein the magnetic field source output is pulsed between no magnetic field and a saturation magnetic field to provide a pulsed laser output.

6. A switchable laser as defined in claim 1 wherein the magnetic field source maintains the application of a saturation magnetic field to said switchable Faraday rotator to provide for continuous lasing output.

* * * * *